Patented Mar. 25, 1924.

1,488,411

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND.

DYESTUFFS CONTAINING CHROMIUM AND PROCESS FOR MANUFACTURE OF SAME.

No Drawing.  Application filed October 18, 1923.  Serial No. 669,402.

*To all whom it may concern:*

Be it known that we, FRITZ STRAUB, residing at Basel, Switzerland, and HERMANN SCHNEIDER, residing at Riehen, near Basel, Switzerland, both citizens of the Swiss Republic, have invented new and useful Dyestuffs Containing Chromium and Processes for the Manufacture of Same, of which the following is a full, clear, and exact specification.

This invention relates to new dyestuffs containing chromium which are valuable acid dyestuffs, and to a process for manufacturing same. The invention comprises, besides the dyestuffs and their manufacturing processes, also the fibers dyed with these dyestuffs.

It has been found that valuable new dyestuffs containing chromium may be obtained by coupling the 1-oxynaphthalene-8-sulfamide with the diazo-compounds which are derived from the ortho-aminonaphthols, their substitution products and their derivatives, and treating the dyestuffs thus obtained with agents yielding chromium.

The dyestuffs thus obtained are therefore derivatives of the azo dyestuffs which correspond with the general formula:

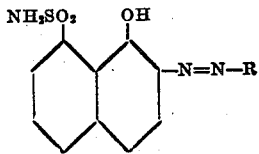

(wherein R signifies an oxynaphthalene nucleus in which the azo-bridge adheres to an ortho-position in respect of the hydroxyl-group) forming bronze powders which dissolve in pure water to blue to green black solutions which change towards violet to black violet respectively on the addition of caustic alkali. Dyed on wool, they produce blue to green-blue and green black tints which are remarkable for their excellent uniformity, prominent fastness to light, and very good fastness to fulling.

*Example 1.*

22.3 parts of 1-oxynaphthalene-8-sulfamide dissolved cold in an excess of aqueous caustic alkali solution are mixed with 27.2 parts of sodium 1-diazo-2-oxynaphthalene-4-sulfonate. When the coupling, which immediately sets in and is advantageously allowed to proceed below 10° C., is complete the mass is made neutral by means of dilute hydrochloric acid, whereupon the dyestuff separates and is filtered. It is a dark powder which dissolves in pure water to a red violet solution, in concentrated sulfuric acid to a blue solution, and in dilute caustic soda lye to a blue red solution. It dyes wool in an acid bath red violet which is changed towards blue when after-chromed.

47.2 parts of the dyestuff thus obtained are introduced into a boiling mixture of 22.4 parts of potassium hydroxide, 8.36 parts of chromium oxide, 9 parts of glycerine and 130 parts of water and the mixture is boiled for a long time in a reflux apparatus. The mixture is then diluted with 300 parts of water made neutral with hydrochloric acid and the new chromium compound precipitated by addition of common salt. When dried the chromium compound is a bronze powder which dyes wool in an acid bath very equal fast blue tints.

A chromium compound which is quite similar is produced when the alkaline chroming is carried out as prescribed in U. S. patent specification 1,221,849 and patent application Serial No. 539,739.

*Example 2.*

24.0 parts of the azo-dyestuff as obtained in the preceding example are dissolved in 500 parts of boiling water and the solution is mixed with a chromium formate solution corresponding with 9.5 parts of $Cr_2O_3$. The mixture is boiled for 24 hours in a reflux apparatus. The solution thus obtained is in part evaporated; on cooling the new chromium compound separates in the form of lustrous crystals. This chromium compound dissolves in pure water to a blue solution; in dilute caustic soda lye to a violet solution. It dyes wool in an acid bath very uniform fast and pure greenish blue tints.

If chromium fluoride or chromium acetate be substituted for chromium formate, the chromium compounds formed also dye wool fast and equal blue tints.

The chromium compounds of the dyestuffs obtained in like manner from 1-oxynaphthalene-8-sulfamide and the halogenated diazo-compounds of 1-amino-2-oxynaphthalene-4-sulfonic acid or from the diazo-compound of 1-amino-2-oxynaphthalene-6-sulfonic acid and 1-amino-2-oxynaphthalene-4-methylensulfonic acid also dye wool blue.

*Example 3.*

22.3 parts of 1-oxynaphthalene-8-sulfamide dissolved cold in an excess of aqueous caustic alkali solution are mixed at 10° C. with 29.5 parts of nitrated 1-diazo-2-oxynaphthalene-4-sulfonic acid. Coupling begins at once. When the diazo-compound has disappeared the product of reaction is made neutral with dilute hydrochloric acid and the dyestuff which separates is filtered. The dyestuff thus obtained is a dark powder soluble in pure water and in dilute caustic soda lye to a red violet solution and in concentrated sulfuric acid to a dark blue solution. It dyes wool in an acid bath black violet, changed towards black when after-chromed.

26 parts of the dyestuff thus obtained are dissolved in 500 parts of boiling water. The solution is mixed with a solution of chromium fluoride corresponding with 9.5 parts of $Cr_2O_3$ and the mixture is boiled for 24 hours in a reflux apparatus, if necessary with addition of glass. The solution is then partly evaporated and the chromium compound which has been formed is separated by salting out. It forms a powder having a bronze lustre; dissolves in pure water to a greenish black solution and in dilute caustic soda lye to a violet black solution. It dyes wool in an acid bath fast black tints.

When another agent adapted to yield chromium, such as freshly precipitated hydrated chromium hydroxide, is used instead of chromium fluoride, chromium compounds are also obtained which dye wool fast black tints.

The chromium compound of the dyestuff obtained in like manner from 1-oxynaphthalene-8-sulfamide and the diazo-compound of 1-oxy-2-amino-4-nitronaphthalene-7-sulfonic acid also dyes wool black.

What we claim is:

1. The herein described process for the manufacture of new dyestuffs containing chromium, which consists in coupling the 1-oxynaphthalene-8-sulfamide with diazo-compounds derived from the ortho-aminonaphthols, and treating the dyestuffs thus obtained with agents yielding chromium.

2. The herein described process for the manufacture of new dyestuffs containing chromium, which consists in coupling the 1-oxynaphthalene-8-sulfamide with diazo-compounds derived from the 1-amino-2-oxynaphthalene-4-sulfonic acid, and treating the dyestuffs thus obtained with agents yielding chromium.

3. The herein described process for the manufacture of new dyestuffs containing chromium, which consists in coupling the 1-oxynaphthalene-8-sulfamide with the diazo-compound of the 1-amino-2-oxynaphthalene-4-sulfonic acid, and treating the dyestuffs thus obtained with agents yielding chromium.

4. As new products the herein described new dyestuffs containing chromium which are derivatives of the azo dyestuffs which correspond with the general formula:

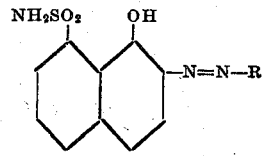

wherein R signifies a naphthalene nucleus in which the azo-bridge adheres to an ortho-position in respect of the hydroxyl-group, which dyestuffs form bronze powders soluble in pure water to a blue to green black solution and in dilute caustic alkalies to a blue violet to black violet solution, dyeing wool in an acid bath blue to green blue and green black tints of excellent uniformity, prominent fastness to light, and very good fastness to fulling.

5. As new products the herein described new dyestuffs containing chromium which are derivatives of the azo dyestuffs which correspond with the general formula:

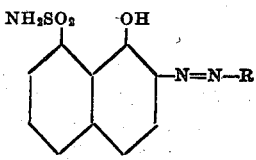

wherein R signifies a sulfonated naphthalene nucleus in which the azo-bridge adheres to an ortho-position in respect of the hydroxyl-group, which dyestuffs form bronze powders soluble in pure water to a blue to green black solution and in dilute caustic alkalies to a blue violet to black violet solution, dyeing wool in an acid bath blue to green blue and green black tints of excellent uniformity, prominent fastness to light, and very good fastness to fulling.

6. As new products the herein described new dyestuffs containing chromium which are derivatives of the azo dyestuffs which correspond with the general formula:

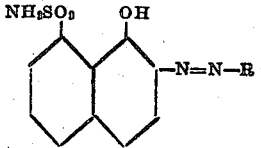

wherein R signifies a 2-oxynaphthalenesulfonic acid nucleus in which the azo-bridge adheres to position-1 of the naphthalene nucleus, which dyestuffs form bronze powders soluble in pure water to a blue to green black solution and in dilute caustic alkalies to a blue violet to black violet solution, dyeing wool in an acid bath blue to green blue and green black tints of excellent uniformity, prominent fastness to light, and very good fastness to fulling.

7. As new products the herein described new dyestuffs containing chromium which are derivatives of the azo dyestuffs which correspond with the general formula:

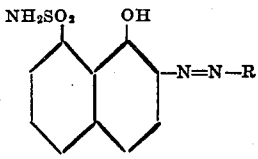

wherein R signifies a 2-oxynaphthalene-4-sulfonic acid nucleus in which the azo-bridge adheres to position-1 of the naphthalene nucleus, which dyestuffs form bronze powders soluble in pure water to a blue to green black solution and in dilute caustic alkalies to a blue violet to black violet solution, dyeing wool in an acid bath blue to green blue and green black tints of excellent uniformity, prominent fastness to light, and very good fastness to fulling.

8. As a new product the herein described new dyestuff containing chromium which is a derivative of the azo dyestuff of the formula:

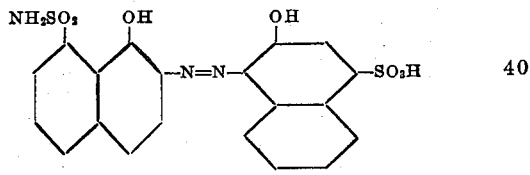

which forms a bronze powder soluble in pure water to a blue to green black solution and in dilute caustic alkalies to a blue violet solution, dyeing wool in an acid bath blue to green blue tints of excellent uniformity, prominent fastness to light, and very good fastness to fulling.

9. Material dyed with the dyestuffs of claim 4.

10. Material dyed with the dyestuffs of claim 5.

11. Material dyed with the dyestuffs of claim 6.

12. Material dyed with the dyestuffs of claim 7.

13. Material dyed with the dyestuffs of claim 8.

In witness whereof we have hereunto signed our names this 8th day of October, 1923, in the presence of two subscribing witnesses.

FRITZ STRAUB.
HERMANN SCHNEIDER.

Witnesses:
ARMAND BRAUN,
LUCIEN PICARD.